United States Patent [19]

Karl et al.

[11] 4,406,531

[45] Sep. 27, 1983

[54] DRIVE FOR A CIRCULAR MAGAZINE OF A SLIDE PROJECTOR

[75] Inventors: Leopold Karl, Würzburg; Manfred Bätz, Eibelstadt; Herbert Wundling, Ochsenfurt; Ralph Weiss, Marktbreit, all of Fed. Rep. of Germany

[73] Assignee: Kindermann & Co. GmbH, Ochsenfurt am Main, Fed. Rep. of Germany

[21] Appl. No.: 297,327

[22] Filed: Aug. 28, 1981

[30] Foreign Application Priority Data

Sep. 8, 1980 [DE] Fed. Rep. of Germany ....... 3033726

[51] Int. Cl.³ ............................................ G03B 23/04
[52] U.S. Cl. .................................................. 353/117
[58] Field of Search ................ 353/107, 117, 104, 116

[56] References Cited

U.S. PATENT DOCUMENTS 3,510,215  5/1970  Bennett .................................. 353/25
3,950,087  4/1976  Erchoff .............................. 353/117 X
4,165,161  8/1979  Kramer .................................. 353/95

*Primary Examiner*—Harry N. Haroian
*Attorney, Agent, or Firm*—Weingarten, Schurgin, Gagnebin & Hayes

[57] ABSTRACT

A drive for a slide projector utilizing circular magazines which permits the slide projector to be used with circular magazines having differing numbers of slide compartments. A variable gear unit, including a shift mechanism to vary the gear ratio, couples a drive motor to a drive ring for rotation of a circular magazine disposed in the projector. The circular magazine is rotated in a stepwise manner, the length of each step depending upon the number of slide compartments which the particular magazine contains. The drive ring is made sufficiently large to accommodate most conventional circular magazines and includes a cam which extends radially inwardly and which is adapted to engage a notch formed on the outer surface of a circular magazine. The circumferential step length is adjusted by changing the gear ratio in the variable gear unit by longitudinal movement of an intermediate drive shaft. The intermediate shaft is provided with a ring and an associated ball bearing which together prevent changing of the gear ratio unless the circular magazine is in a predetermined or zero position in which a notch on the drive ring is positioned above the ball bearing.

9 Claims, 2 Drawing Figures

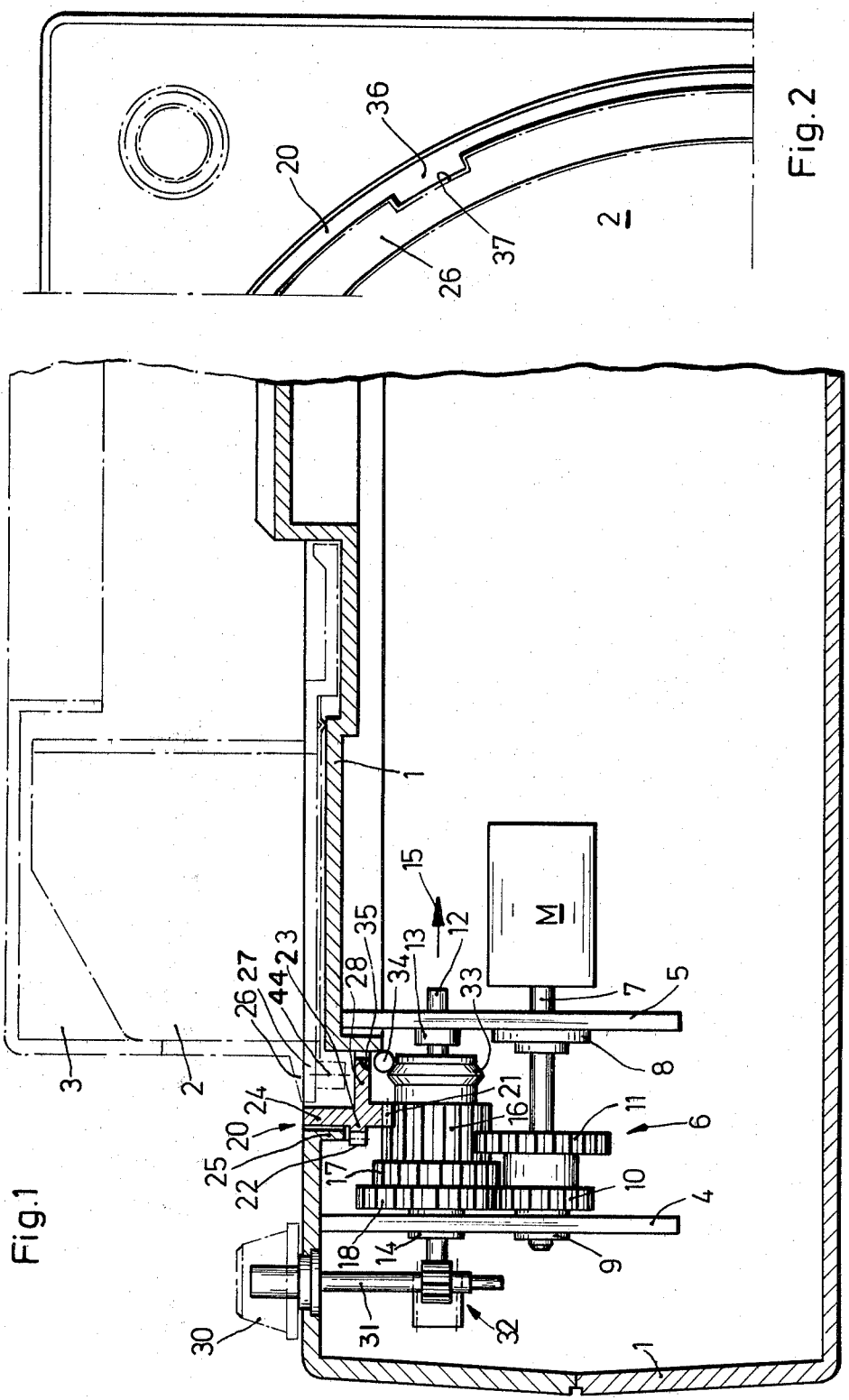

DRIVE FOR A CIRCULAR MAGAZINE OF A SLIDE PROJECTOR

FIELD OF THE INVENTION

This invention relates generally to a drive for slide projectors utilizing circular magazines and more particularly concerns a drive adapted to accommodate circular magazines having varying numbers of slide compartments.

BACKGROUND OF THE INVENTION

Slide projectors utilizing circular magazines are well known. Generally, the circular magazine carrying individual slides in separate compartments is rotated in a stepwise manner by a suitable gear unit to bring the individual slides sequentially into position for removal. Usually, the circular magazine can be loosely inserted into the slide projector. The drive connection between the circular magazine and the gear unit is effected in such known systems either by cams provided on the outer edge of the circular magazine which cooperate with suitable gear components, or by a gear rim formed at the base of the magazine or on its peripheral surface which meshes with a drive component such as a pinion when the circular magazine is placed into the projector housing. Such known slide projectors differ from one another in the maximum number of slides which can be carried in their circular magazine. Since the external diameters of the various known circular magazines generally are equal, the circumferential length of each turning step is necessarily different for different magazines depending upon the maximum number of slides carried. For example, for a circular magazine capable of carrying 80 slides, the actual length of the circumferential step must be greater than for a circular magazine capable of carrying 120 slides in order that each successive slide be brought into proper position for removal.

For this reason, it has not been possible until the present invention to use, in the same slide projector, circular magazines from different manufacturers or with a different maximum number of slides carried. One of the most widely used circular magazines consists of an approximately flat circular sheet metal base plate upon the upper part of the magazine is rotatably fixed with compartments for 140 slides. A device interconnects the base plate with the upper part of the magazine. The bolt of the locking device is spring-loaded and extends between teeth which are formed on a gear rim disposed on the inner wall of the upper part of the magazine. A suitable notch is provided on the outside wall of the upper part of the magazine. In the case of another frequently used circular magazine, an approximately flat base plate having a removal slot for the individual slides is rotatably disposed with respect to the upper part of the magazine which has 80 individual compartments for slides. In order to rotate the slides individually to a position over the removal slot in the base plate, a large number of lugs is provided in regularly spaced relation on the upper part of the magazine radially outside of the base plate and these lugs form a continuous gear rim. To rotate the upper part of the magazine, a finger coupled by a gear to the drive motor engages the gear rim between two lugs, and when a corresponding switch on the upper part of the magazine is actuated, the finger rotates the upper part by one step.

It is obvious that each of the previously described circular magazines is suitable only for a particular projector whose drive system is specifically adapted for the design of the circular magazine. In practice, users are forced to utilize only magazines with projectors which are designed for each other. This result is especially disadvantageous for those users who have several projectors and a large number of magazines, as is frequently the case in schools and universities. Previously, when a newer slide projector was obtained to replace equipment which was damaged or worn out, it was necessary to remove the individual slides from the old magazines by hand and to place them into the new magazine, a procedure which is not only troublesome, but which is quite time consuming.

SUMMARY OF THE INVENTION

It is an object of this invention to provide a drive for a slide projector used with a circular magazine which is suitable for circular magazines of various different design and having different numbers of slide compartments.

In accordance with this invention, the above described problem is overcome by providing a variable gear unit and by providing a drive ring which is rotatably mounted in the projector housing and which meshes with the drive component of the variable gear unit and which has a recess conforming to the outside diameter of the circular magazine and a cam for retaining the circular magazine in place.

The drive ring is configured such that any circular magazine which has teeth or lugs projecting downwardly at its base or which has an approximately flat surface on its base can be placed in the recess in the drive ring. The variable gear unit of this invention makes it possible to change the circumferential length of each step for stepwise or continuous rotation of the magazine. Thus, this invention permits use with one projector of the same or different circular magazines which may carry any number of slides, as for example, 60, 80, 100, 120 or more slides.

The drive system of this invention permits the operator to continue to use already existing circular magazines in another projector while previously these magazines could be used only with a specifically designed projector. This feature is especially suited for those users who have several projectors and a large number of magazines. These users include schools, universities and other educational establishments which own a large number of pieces of projection equipment and where the same slides are repeatedly shown over long periods of time for different educational fields of study.

Since, for different circular magazines, the maximum number of slides carried is a fixed quantity such as 60, 80, 120, 140, etc., the variable gear unit should be operated so that the circumferential length of each step is inversely proportional to the number of slides. For this purpose, according to a further embodiment of this invention, the variable gear unit includes a mechanism for changing the gear ratio, and switching can be effected automatically by means of an actuating mechanism or manually by means of a control element.

Preferably, the drive ring includes a rack or a geared rim on its underside, which meshes with an output pinion of the variable gear unit. Furthermore, the drive ring includes another gear rim for indexing which is preferably disposed on its outer circumference.

According to another embodiment of this invention, the drive ring may exhibit an approximately L-shaped cross sectional profile and may be arranged in the projector housing in such a way that the gear rim on the lower edge of the circular magazine resides in the recess formed by the underside and outer gear rims. The upper edge of the outer gear rim should be flush with the upper surface of the housing. Because of the large size of the recess, circular magazines can easily be placed within the drive ring recess and circular magazines can be placed into the drive ring recess without interfering with its gear rims and they can be driven by the drive ring.

Preferably, a locking mechanism is provided between one driven gear part and the drive ring so that the variable gear unit can be shifted only when the drive ring is in a predetermined position, such as in a zero position of the magazine. Typically, this locking mechanism contains a ball bearing, which bears against a ring on the drive shaft of the variable gear unit. When the drive ring is in the desired position, the ball bearing enters a correspondingly formed recess on the drive ring to permit axial movement of an intermediate drive shaft to change gears.

The circular magazine is synchronized with the drive ring by a cam formed on the drive ring which engages a suitably sized notch on the outside edge of the circular magazine. In order to compensate for the small diameter differences of the different circular magazines, this cam can be spring-loaded. The cam also serves as a centering element. Additional spring elements, as for example spring shackles, can be arranged in the recess of the drive ring to provide an interference-free mounting and retention of circular magazines of different sizes.

DESCRIPTION OF THE DRAWING

The objects, advantages and features of this invention will be more clearly appreciated from the following detailed description taken in conjunction with the accompanying drawing in which:

FIG. 1 is a vertical cross sectional view of a slide projector having a drive system according to this invention; and FIG. 2 is a top schematic view of the projector of FIG. 1 showing a part of the cover plate of the drive ring and a part of a circular magazine.

DETAILED DESCRIPTION OF THE PREFERRED EMBODIMENTS

The slide projector of this invention as shown in FIG. 1 includes a normally horizontal two-piece housing 1 and a circular magazine 2, which is enclosed by a cover 3. Two normally vertical intermediate walls 4 and 5 are fastened to the upper part of housing 1 and walls 4 and 5 extend into the inner chamber of the housing. Both walls 4 and 5 serve as supports for an electric drive motor M as well as for a variable gear unit 6. A drive shaft 7 is mounted in a support 8 in wall 5 as well as in a support 9 in wall 4 and includes two spur gears 10 and 11 which have different outside diameters and which are not rotatably secured to shaft 7. Disposed above and parallel to drive shaft 7 is another intermediate shaft 12 which is mounted in supports 13 and 14 in respective walls 5 and 4 and which is longitudinally shiftable in the direction of arrow 14. Three gear wheels 16, 17 and 18 are fastened onto intermediate shaft 12. Gear wheels 16, 17 and 18 can be meshed selectively with gear wheels 10 and 11 to vary the gear ratio by axial shifting of shaft 12 to provide the appropriate alignment. Gear rim 21 formed on the lower side of gear wheel 16 is meshed in constant engagement with a drive ring 20, which has a generally L-shaped cross-section. Another indexing gear rim 22 is provided on the outer circumference of drive ring 20 and rim 22 is formed on a radially outwardly extending projection 23. Projection 23, together with a normally vertical side piece 24 of drive ring 20 form a stop which is engagable by a downwardly extending portion 25 of the housing wall to prevent removal of the drive ring from housing 1.

The circular magazine, shown schematically by dotted lines 2, includes an outer edge 26 on its base upon which a gear rim 27 is formed. Gear rim 27 includes regularly spaced, downwardly extending pins 44. The recess formed by side piece 24 and side piece 28 of drive ring 20 is sufficiently large so that there is no contact between pin 44 and horizontal side piece 28. Furthermore, drive ring 20 is arranged in the housing in such a way that the upper edge of side piece 24 is flush with the upper housing surface.

An actuating mechanism serves to actuate the variable gear unit and includes an adjustment knob 30 which is rotatably mounted in the upper housing wall and which rests on a shaft 31. Shaft 31 is removably connected to shaft 12 by toothed components 32. Rotation of adjustable knob 30, causes shaft 12 to shift longitudinally which produces a shifting of gears in variable gear unit 6.

So that shifting of gears in variable gear unit 6 may only occur when magazine 2 is in a single desired angular position, such as a zero-position, a locking mechanism is provided which includes a ring 33 fastened onto shaft 12, a ball bearing 34 and a ball bearing shaped recess 35. The position of the recess 35 corresponds to the zero position of the circular magazine, so that shaft 12 can be shifted longitudinally together with ring 33 only when recess 35 lies opposite ball bearing 34. Ball bearing 34 is shoved upwardly into recess 35 only by a longitudinal shifting of shaft 12 and ring 33.

As shown in FIG. 2, the locking connection between drive ring 20 and outer edge 26 of circular magazine 2 is effected by a cam 36 which extends radially inwardly, and which lockingly engages a correspondingly formed notch 37 on outer edge 26 of circular magazine 2.

The previously described drive system works as follows. Circular magazine 2 is placed in the usual manner on the upper cover plate of projector housing 1. Gear rim 27 which serves to permit rotation of the circular magazine in a stepwise manner resides in the recess formed by piece 24 and piece 28 of drive ring 20 with clearance on all sides. Cam 36 formed on the drive ring and extending inwardly, is placed into engagement is meshed with notch 37 on edge 26 of the circular magazine simply by rotation of the circular magazine. As a result thereof, a nonrotatable connection is established between drive ring 20 and circular magazine 2. Because of the locking mechanism, the circular magazine is automatically aigned in its zero position, in which the first slide can be shown. Before turning on the drive, that is to say before starting the projector, it is necessary to set the variable gear unit to the appropriate step size which is determined by the slide capacity of the circular magazine. This is accomplished by a suitable rotation of knob 30. After adjusting the variable gear unit, the projector is operationally ready, and one can begin the presentation in the usual manner.

This invention is not limited to the illustrated example. Rather, another gear mechanism can be used instead of the shown gear unit. In particular, a rocking lever linkage may be used, instead of the spur gears shown in FIG. 1. In such an embodiment, one adjustable lever would engage the teeth formed on the drive ring, which would consist of cylinders or tapered lugs and the drive ring would be rotated stepwise through an adjustable angle. Furthermore, an alternative locking mechanism could be provided in which a spring produces the locking engagement. Finally, in another example, the moveable gear unit may be shifted by means of a motor.

The above description is exemplary only, and modifications and improvements are intended to fall within the scope of this invention as defined solely in the following claims.

What is claimed is:

1. A drive system for a circular magazine of a slide projector comprising:
   a drive ring rotatably mounted on the housing of the projector;
   an electrical drive motor;
   a variable gear means coupling said motor to said drive ring for stepwise rotation of said drive ring in uniform, discrete steps having a desired circumferential length;
   means for coupling said drive ring to said circular magazine; and
   means connected to said variable gear means for selectively varying said circumferential length.

2. The drive system according to claim 1 wherein the variable gear means comprises a first plurality of gears selectively coupled to selected ones of a second plurality of gears to provide different gear ratios.

3. The drive system according to claim 1 or 2 wherein said drive ring comprises a first gear rim on a lower front side thereof which meshes with a driving pinion of said variable gear means.

4. The drive system according to claim 3 wherein said drive ring comprises an indexing gear rim on its outer peripheral edge.

5. The drive system according to claim 4 wherein said drive ring has a generally L-shaped cross-sectional profile and is disposed such that a gear rim provided on the edge of a circular magazine is spaced from said first gear rim and said indexing gear rim of said drive ring.

6. The drive system according to claim 2 wherein variable gear means comprises means for shifting said first plurality of gears with respect to said second plurality of gears.

7. The drive system according to claim 1 further comprising a releasable locking mechanism for preventing operation of said varying means unless said driving ring is in a predetermined position.

8. The drive system according to claim 7 wherein said locking mechanism comprises:
   a ring disposed on a drive shaft coupled to said varying means and longitudinally shiftable thereby;
   a ball disposed on said ring in slidable contact with the circumference of said drive ring to prevent longitudinal shifting of said drive shaft; and
   a recess disposed at one point on the circumference of said drive ring and adapted to accommodate said ball only when aligned therewith to permit longitudinal shifting of said drive shaft.

9. The drive system according to claim 8 wherein said coupling means comprises a cam disposed on said drive ring adapted to engage a notch provided on an outer edge of the circular magazine.

* * * * *